United States Patent [19]
Barbé et al.

[11] Patent Number: 4,978,648
[45] Date of Patent: * Dec. 18, 1990

[54] CATALYSTS FOR THE POLYMERIZATION OF OLEFINS

[75] Inventors: Pier C. Barbé; Luciano Noristi, both of Ferrara; Raimondo Scordamaglia, Milan; Luisa Barino, Novara; Enrico Albizzati, Arona; Umberto Giannini, Milan; Giampiero Morini, Voghera, all of Italy

[73] Assignee: Himont Incorporated, Wilmington, Del.

[*] Notice: The portion of the term of this patent subsequent to Nov. 20, 2007 has been disclaimed.

[21] Appl. No.: 413,430

[22] Filed: Sep. 27, 1989

[30] Foreign Application Priority Data

Sep. 30, 1988 [IT] Italy .................... 22151 A/88

[51] Int. Cl.$^5$ ............................. C08F 4/646
[52] U.S. Cl. .................... 502/127; 502/126; 502/134; 526/125
[58] Field of Search ............ 502/126, 127, 134

[56] References Cited

U.S. PATENT DOCUMENTS

| | | |
|---|---|---|
| 4,246,383 | 1/1981 | Gessell ................ 502/134 X |
| 4,298,718 | 11/1981 | Mayr et al. ............ 502/134 X |
| 4,400,303 | 8/1983 | Martin ................. 502/126 |
| 4,522,930 | 6/1985 | Albizatti et al. ....... 502/126 X |
| 4,762,898 | 8/1988 | Matsuura et al. ........ 502/126 X |

Primary Examiner—Patrick P. Garvin

[57] ABSTRACT

Catalysts for the polymerization of olefins, particularly alpha-olefin of the formula $CH_2=CHR$ in which R is an alkyl radical with 1-6 carbon atoms or an aryl radical, obtained by the reaction of:

(a) an Al-alkyl compound;
(b) an ether containing at least two ether groups which can form complexes with anhydrous magnesium dichloride, under standard conditions of reaction, in an amount less than 60 mmol per 100 g Mg dichloride; and
(c) a solid catalyst component comprising an anhydrous magnesium dihalide in active form and having supported thereon a titanium compound containing at least a Ti-halogen bond and an electron-donor compound which is at least 70 mole % extractable with Al-triethyl, under standard conditions of extraction, component wherein the solid, after extraction, has a surface area of more than 20 $m^2g$.

11 Claims, No Drawings

CATALYSTS FOR THE POLYMERIZATION OF OLEFINS

This invention relates to catalysts for the polymerization of olefins and their use particularly in the polymerization of olefins of the formula $CH_2=CHR$ in which R is an alkyl radical with 1-6 C or an aryl radical.

Catalysts containing titanium compounds supported on magnesium halides in active form are well known in the art.

Catalysts of this type were described for the first time in Belgian patent No. 742,112, and corresponding to U.S. Pat. No. 4,278,718. The catalysts referred to in the above Belgian patent, even though endowed with high activity in the polymerization of ethylene or alpha-olefins such as propylene, polymerization, show a very low stereospecificity.

Improvements in stereospecifity were obtained by adding an electron donor compound to the supported component containing the titanium compound, see e.g. U.S. Pat. No. 4,544,717.

Further improvements were obtained by using an electron donor in the solid catalyst component and an electron donor with the Al-alkyl compound co-catalyst, see e.g. U.S. Pat. No. 4,107,414.

High performances both in activity and stereospecificity, were obtained with the catalysts described in European patent No. 0045977. These catalysts comprise a solid catalyst component containing magnesium dihalide in active form on which is supported a titanium halide (TiCl4) and an electron-donor compound selected from specific classes of carboxylic acid esters, of which the phthalates are typical preferred relevant examples. As co-catalysts, a system formed of an Al-alkyl compound and a silicon compound having at least one Si-OR bond, where R is a hydrocarbon radical, is used.

In U.S. Pat. No. 4,522,930 are described catalysts having a solid catalyst component containing an electron donor that is at least 70 mole % extractable with Al-triethyl, under standard conditions of extraction, from the solid, and the surface area of the solid component is at least 20 m²/g, after extraction. These catalysts include, in addition to the solid component and the Al-trialkyl compound, an electron donor which does not undergo complex formation with Al-triethyl detectable by potentiometric titration. The electron donors mentioned comprise silicon compound with Si-OR bonds, 2,2,6,6,-tetramethylpiperidine, 2,2,5,5-tetramethylpyrrolidine, Al-diethyl-2,2,6,6-tetramethylpiperidine and Al-dichloromonophenoxy.

A new class of electron donors different in their structure from the electron donors used up to now has now been found, which form catalysts endowed with high activity and stereospecificity.

The electron donors used in the catalysts of the invention are selected from ethers containing two or more ether groups and capable of complexing anhydrous magnesium dichloride having a specific degree of activation in an amount less than 60 mmoles per 100 g of $MgCl_2$.

Ethers having the above mentioned characteristics are 1,3-diethers of the formula:

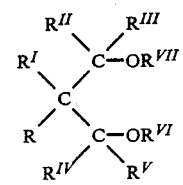

in which R, $R^I$, $R^{II}$, $R^{III}$, $R^{IV}$ and $R^V$ are the same or different and are H, linear or branched alkyl radicals, or cycloalkyl, aryl, alkylaryl or arylalkyl radicals with 1-18 carbon atoms, provided $R^I$ and R' are not both hydrogen; $R^{VI}$ and $R^{VII}$ have the same meaning of R and $R^I$ except for hydrogen; provided that when $R^I$ to $R^V$ are hydrogen and $R^{VI}$ and $R^{VII}$ are methyl, R is not methyl; and two or more R to $R^{VII}$ can be linked to form a cyclic structure.

When the radicals from $R^I$ to $R^V$ are hydrogen and $R^{VI}$ and $R^{VII}$ are methyl, R is other than methyl. Relevant examples of the above mentioned ethers are: 2-(2-ethylhexyl)-1,3-dimethoxypropane, 2-isopropyl-1,3-dimethoxypropanes 2-methyl-1,3-dimethoxypropane, 2-butyl-1,3-dimethoxypropane, 2-sec-butyl-1,3-dimethoxypropane, 2-cyclo-hexyl-1,3-dimethoxypropane, 2-phenyl-1,3-dimethoxypropane, 2-tert-butyl-1,3-dimethoxypropane, 2-cumyl-1,3-diethoxypropane, 2-(2-phenylethyl)-1,3-dimethoxypropane 2-(2-cyclohexylethyl)-1,3-dimethoxypropane, 2-(2-p-chlorophenyl)-1,3-dimethoxypropane, 2-(diphenylmethyl)-1,3-dimethoxypropane, 2-(1-naphthyl)-1,3-dimethoxypropane, 2-(p-fluoro phenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-diethyl-1,3-dimethoxy propane, 2,2-dipropyl-1,3-dimethoxypropane, 2,2-dibutyl-1,3-dimethoxypropane, 2,2-diethyl-1,3-diethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis-(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-di-(2-ethylhexyl)-1,3-dimethoxypropane, 2,2-bis-(p-methylphenyl)-1,3-dimethyoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis-(methylcyclohexyl)-1,3-dimethoxypropane, 2,2- diisobutyl-1,3-diethoxypropane, 2,2-diisobutyl-1,3-dibutoxypropane, 2-isobutyl-2-isopropyl-1,3-dimethoxypropane, 2,2-disec-butyl-1,3-dimethoxypropane, 2,2-di-tert-butyl-1,3-dimethoxypropane, 2,2-di-neopentyl-1,3-dimethoxypropane, 2-isopropyl-2-isopentyl-1,3-dimethoxypropane, 2-phenyl-2-benzyl-1,3dimethoxypropane, 2-cyclohexyl-2-cyclohexylmethyl-1,3-dimethoxypropane, 1-isopropyl-2,2-dimethyl-1,3-dimethoxypropane, 1,1,3-trimethyl-1,3-dimethoxypropane. Other examples of suitable ethers are: 2,3-diphenyl-1,4-diethoxybutane, 2,3-dicyclohexyl-1,4-diethoxybutane, 2,3-dibenzyl-1,4-diethoxybutane, 2,3-dibenzyl-1,4dimethoxybutane, 2,3-dicyclohexyl-1,4-dimethoxybutane, 2,3-diisopropyl-1,4-diethoxybutane, 2,3-diisopropyl-1,4-diethoxybutane, 2,2- bis-(p-methylphenyl)-1,4-dimethoxybutane, 2,3-bis-(p-chlorophenyl)-1,4-dimethoxybutane, 2,3-bis-(p-fluorophenyl)-1,4-dimethoxybutane, 2,4-diphenyl-1,5-dimethoxypentane, 2,5-diphenyl-1,5-dimethoxypentane, 2,4-diisopropyl-1,5-dimethoxypentane, 2,5-diphenyl-1,5-dimethoxypentane, 3-methoxymethyltetrahydrofuran, 3-methoxymethyldioxane, 1,1-dimethoxymethyl-1,2,3,4-tetrahydronaphthalene, 1,1-dimethoxymethyldecahydronaphthalene, 1,1-dimethoxymethylindane, 2,2-dimethoxymethylindane, 1,1-dimethoxymethyl-2-isopropyl-5-methylcyclohexane, 1,3-diisobutoxypropane, 1,2-diisobutoxyethane, 1,3-diisoamyloxypropane, 1,2-diisoamyloxyethane, 1,3-dineopentoxypropane, 1,2-dineopentoxyethane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro-(5-5)-undecane, 3,7-dioxabicyclo-(3,3,1)-nonane, 3,7-dioxabicyclo-(3,3,0)octane, 3,3-diisobutyl-1,5-dioxanane, 6,6-diisobutyldioxepane, 1,1-dimethoxymethylcyclopropane, 1,1-bis(methoxymethyl)cyclohexane, 1,1-bis(methoxymethyl)bicyclo(2,2,1)-heptane, 1,1-dimethoxymethylcyclopentane, 2-methyl-2-methoxymethyl-1,3-dimethoxypropane, orthomethoxybenzylmethylether, 1,1,1-trimethoxymethylethane, tetramethoxymethylmethane, 1,2-bis(methoxymethyl)bicyclo(2,2,1)heptane, 1,1,2,2 tetramethyl-1,2-dimethoxyethane, 1,2-dimethyl-1,2-dimethoxyethane, 2,2,3,2-tetramethyl-1,4-dimethoxybutane, 2,2,3,3-tetraethyl-1,4-dimethoxybutane, 2,2,3,3-tetramethyl-1,4-diethoxybutane, 2,2,3,3-tetraethyl-1,4-diethoxybutane.

Preferred ethers are those having the general formula herein above and particularly those in which $R^{VI}$ and $R^{VII}$ are methyl and R and $R^I$ are the same or different and are isopropyl, isobutyl, t-butyl, cyclohexyl, isopentyl, and ethylcyclohexyl. Particularly preferred are 2,2-diisobutyl-1,3-dimethoxypropane, 2-isopropyl-2-isopentyl-1,3-dimethoxypropane, 2,2-bis-(cyclohexylmethyl)-1,3 dimethoxypropane.

The test of ether complexation of $MgCl_2$ is carried out as follows. Into a 100 ml glass flask with a fixed blade glass stirrer under a nitrogen atmosphere 70 ml anhydrous n-heptane, 12 mmols anhydrous $MgCl_2$, activated as hereinafter described, and 2 mmols ethers were introduced and heated at 60° for 4 hours with a stirring velocity of 400 rpm. The reaction mixture was filtered and washed at room temperature with 100 ml portions of n-heptane and then dried with a mechanic pump.

The solid, after treatment with 100 ml of ethanol, was analyzed by gas chromatography to determine the quantity of ether complexed. The complexation test results are reported in Table I. The magnesium dichloride used in the complexation test with ether was prepared as follows: in a vibratory mill jar (Siebtechnik Vibratom), having a 1 liter capacity and loaded with 1.8 Kg of steel spheres with 16 mm diameter, 50 g anhydrous $MgCl_2$ and 6,8 ml 1,2-dichloroethane (DCE) were introduced under nitrogen atmosphere.

The contents was milled for 96 hours at room temperature after which the solid was recovered and kept under vacuum at 50° C. for 16 hours. Solid characterization:

Half peak breadth of reflection D110=1.15 cm.
Surface area (BET)=125 $m^2/g$.
DCE residual=2.5% by weight.

Catalyst components usable with the electron donors of this invention are described in U.S. Pat. No. 4,522,930, the description of which is incorporated herein by reference. As already mentioned, the solid catalyst components described in U.S. Pat. No. 4,522,930 comprise a titanium component with at least a Ti-halogen bond and an electron donorcompound which is at least 70 mole % extractable with Al-triethyl under standard conditions of extraction from the solid. After extraction, the solid has a surface area (B.E.T.) of at least 20 $m^2/g$ and in general comprised between 100 and 300 $m^2/g$.

The electron-donor compounds suitable for preparing the catalyst components described in the U.S. patent include ethers, ketones, lactones, electron donors compounds with N, P and/or S atoms and specific classes of esters. In addition to the esters of U.S. Pat. No. 4,522,930, the esters described in European patent No. 45,977 are also suitable.

Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. The esters of phthalic acid are the preferred donors.

The preparation of the solid catalyst components is carried out according to several methods. In one method, the magnesium dihalide in an anhydrous state containing less than 1% water, the titanium compound and the electron-donor compound are milled together under conditions in which activation of the magnesium dihalide occurs. The milled product is then treated one or more times with an excess of $TiCl_4$ at a temperature between 80° and 135° C., and then washed repeatedly with a hydrocarbon solvent such as hexane, until there are no chlorine ions in the water.

According to another method, anhydrous magnesium dichloride is preactivated according to well known methods and then treated with excess $TiCl_4$ containing in solution an electron donor compound at a temperature of about 80° to 135° C. The treatment with $TiCl_4$ is repeated and the solid is washed with hexane to eliminate any unreacted $TiCl_4$.

According to another method, a $MgCl_2.nROH$ adduct (especially in the form of spherical particles) in which n is 1 to 3 and ROH is ethanol, butanol, or isobutanol, is treated with excess $TiCl_4$ containing an electron-donor compound in solution at a temperature of about 80° and 120° C. After reaction, the solid is again treated with $TiCl_4$, then separated and washed with hydrocarbon until the chlorine ions are removed.

According to a further method, magnesium alcoholates or chloroalcoholates (in particular chloroalcoholates prepared according to U.S. Pat. No. 4,220,554) are reacted with an excess of $TiCl_4$ containing in solution an electron-donor compound, operating also under the reaction conditions described above.

According to another method, complexes of magnesium halides with titanium alcoholates (complex $MgCl_2.2Ti(OC_4H_9)_4$ is an example) are reacted in hydrocarbon solution with an excess of $TiCl_4$ containing in solution an electron-donor compound; the solid product is separated and then further reacted with an excess of $TiCl_4$ at 80°–120° C. The solids were then separated and washed with hexane.

According to a variant of the above method, the complex between $MgCl_2$ and the titanium alcoholate is reacted in hydrocarbon solution with hydropolyxylosane. The solid product is separated and reacted at 50°

C. with silicon tetrachloride containing in solution an electron-donor compound. The solid is then reacted with excess TiCl$_4$ at 80°–100° C.

In addition to the above methods it is possible to react an excess of TiCl$_4$ containing in solution an electron-donor compound with porous styrene-divinylbenzene resins in the form of spherical particles or inorganic porous supports, such as silica and alumina impregnated with a solution of Mg compound or complexes soluble in organic solvents.

The porous resins which can be used in the present invention and their impregnation method are described in U.S. patent application Ser. No. 07/359,234.

Reaction with TiCl$_4$ is carried out at 80°–100° C.; after separating the TiCl$_4$ excess, the reaction is repeated and the solid is then washed with hydrocarbon.

The molar ratio of MgCl$_2$ to the electron-donor compound used in the above described reactions is between 4:1 and 12:1. The amount of electron-donor compound which remains fixed on the magnesium dihalide is between 5 and 20 mole %. In the case of components supported on resins and inorganic porous supports, the molar ratio of the electron-donor compound to magnesium is higher and in general comprised between 0.3 and 0.8. In the solid catalyst components the ratio Mg/Ti is usually between 30:1 and 4:1. When the components are supported on a resin or on an inorganic porous support the ratio is lower and is generally between 3:1 and 2:1.

Suitable titanium compounds used for the preparation of the solid catalyst components are the halides and the haloalcoholates. Titanium tetrachloride is the preferred compound. Satisfactory results are also obtained with Ti-trihalides in particular TiCl$_3$-HR, TiCl$_3$-ARA, and with haloalcoholates like TiCl$_3$ OR in which R is a phenyl radical. The above mentioned reactions lead to the formation of magnesium halides in active form. Besides these reactions, other reactions are well known in literature which form magnesium halides in active form starting from magnesium compounds different from the halides.

The active form of magnesium dihalides in the solid catalyst components is evidenced in the X-ray spectrum of the catalyst component in which the most intense reflection line appearing in the spectrum of non-activated magnesium dihalide having a surface area less than 3 m$^2$/g, is absent and is substituted by a halo with the maximum of intensity shifted with respect to the position of the most intense reflection line, or from the fact that the most intense reflection line shows a half peak breadth which is at least 30% greater than the breadth of the most intense reflection line appearing in the spectrum of non-activated Mg dihalide. The most active forms are those in which the halo appears in the X-ray spectrum of the solid catalyst component.

The highly preferred magnesium halide is magnesium dichloride. In the case of the most active forms of magnesium dichloride, the X-ray spectrum of the catalyst component shows a halo in place of the most intense diffraction line that in the spectrum of non-activated magnesium dichloride appears at a distance of 2.56 Å.

The solid catalyst component of the present invention forms, by reaction with Al-alkyl compounds, catalysts suitable for the polymerization of olefins of the formula CH$_2$=CHR in which R is hydrogen, an alkyl radical with 1–6 carbon atoms, an aryl radical, or mixtures of said olefins with each other and/or with diolefins such as butadiene.

In the case of the polymerization of CH$_2$=CHR olefins in which R is an alkyl radical with 1–6 carbon atoms or an aryl radical, particularly when the olefin is propylene, the Al-alkyl compounds are selected from the Al-trialkyls such as Al-triethyl, Al-triisobutyl, Al-tri-n-butyl and linear or cyclic Al-alkyl compounds containing two or more atoms of Al linked to each other through an oxygen or a nitrogen atom or through SO$_4$ and SO$_3$ groups. Examples of these compounds are:

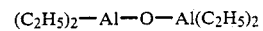

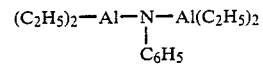

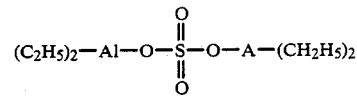

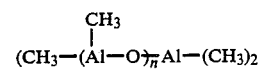

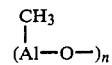

in which n is a number from 1 to 20. In addition, AlR$_2$OR$^I$ compounds, in which R$^I$ is an aryl radical substituted in one or both or ortho positions and R is an alkyl radical with 1–6 carbon atoms, and AlR$_2$H compounds in which R has the meaning as above indicated, are also suitable. The Al-alkyl compound is used in an amount such that the ratio of Al/Ti is between 1 and 100.

In the case of polymerization of propylene and other alpha olefins, the trialkyl compounds may be used in mixture with Al-alkyl halides such as AlEt$_2$Cl. The catalysts of the invention include the product of the reaction between the following components:

(a) An Al-alkyl compound, in particular an Al-trialkyl compound;

(b) An ether with at least two ether groups, which complexes with anhydrous magnesium dichloride in active form under standard conditions, in an amount less than 60 mmols/100 g MgCl$_2$;

(c) a solid comprising an anhydrous magnesium halide in active form having supported thereon a titanium compound with at least one Ti-halogen bond and an electron-donor compound which is more than 70 mole % extractable from the solid compound by reaction with Al-triethyl under standard conditions of extraction, the solid component after extraction having a surface area of more than 20 m$^2$/g.

Olefin polymerization is carried out according to known methods in liquid phase using the liquid monomer or a solution of liquid monomer or monomers in an aliphatic or aromatic hydrocarbon solvent, in gas phase or in a combination of liquid phase and gas phase processes.

The temperature of (co)polymerization is generally from 0° to 150° C.; in particular between 60° and 100° C. The polymerizations are carried out at atmospheric or higher pressure.

The catalyst can be precontacted with small quantities of olefin monomer (prepolymerization). Prepolymerization improves the catalyst performance as well as polymer morphology.

Prepolymerization is carried out by maintaining the catalyst in suspension in a hydrocarbon solvent (hexane, heptane etc) at a temperature from room temperature to 60° C. for a time sufficient to produce a quantity of polymer from 0.5 to 3 times the weight of the solid catalyst component. Prepolymerization can also be carried out in liquid propylene under the same conditions of temperature as above to produce up to 1000 g polymer per g of catalyst component.

In the case of stereoregular polymerization of olefins, the molar ratio between the Al-alkyl compound and the ether donor is in general from 5:1 to 100:1.

The following examples are illustrative but not limiting the invention.

EXAMPLES

Preparation of the solid catalyst component

Into a 500 ml reactor equipped with a filter disk on the bottom 225 ml $TiCl_4$ was introduced at 0° C. and with stirring over a period of 15 minutes, 10.1 g (54 mmols) $MgCl_2.2C_2H_5OH$ in microspherical form prepared according to example 1 of U.S. Pat. No. 4,469,648 was added. Upon completion of the addition, the temperature was raised to 40° C. and 9 mmols diisobutyl phthalate was introduced. The temperature was then raised to 100° C. over 1 hour and the mixture was reacted for 2 hours. The excess $TiCl_4$ was then removed by filtration. 200 ml $TiCl_4$ was then added and the contents heated at 120° C. for 1 hour with stirring. The mixture was filtered and the solid washed with n-heptane at 60° until no chlorine ions were in the filtrate.

Polymerization

In a 2000 ml stainless steel autoclave equipped with an anchor stirrer there was introduced, at 25° C. under propylene flow, 1000 ml n-heptane, 5 mmols $Al(C_2H_5)_3$, 30 mg of catalyst component and 1 mmol of an ether compound set forth in Table 2.

The autoclave was closed. After the pressure had been set at 1 atm, 0.2 atm hydrogen was introduced and the contents heated at 70° C. while propylene was fed in up to a total pressure of 7 atm.

The polymerization was carried out for 2 hours. During that period monomer feeding was continued. The polymer was isolated by filtration at the end of the reaction period, and vacuum dried. The remaining portion of polymer in the filtrate was precipitated with methanol, vacuum dried and considered in determining the total residue extractable with n-heptane.

The ether donors used, the results of the polymerization (yield and total isotactic index II) and the intrinsic viscosity of polymer produced are reported in Table 2.

TABLE 1

| ETHERS | COMPLEXATION WITH $MgCl_2$ (*) |
|---|---|
| 2,2-dimethyl 1,3-dimethoxypropane | 3.5 |
| 2 methyl-2isopropyl 1,3-dimethoxypropane | 1.6 |
| 2,2-diisobutyl 1,3-dimethoxypropane | 3.3 |
| 2,2-diisobutyl 1,3-diethoxypropane | 2.0 |
| 2,2-diisobutyl 1,3-di-n-butoxypropane | 0.5 |
| 2,2-diphenyl 1,3-dimethoxypropane | 0.7 |
| 2,2-bis (methylcyclohexyl) 1,3-dimethoxypropane | 1.8 |
| 1,3-diisobutoxypropane | 2.6 |
| 2,2-pentamethylen 1,3-dimethoxypropane | 2.4 |
| 1,1-bis (methoxymethyl) bicyclo (2,2,1) heptane) | 1.9 |
| 1-isopropyl-2,2-dimethyl 1,3-dimethoxypropane | 1.3 |
| 2-isopentyl-2-isopropyl 1,3-dimethoxypropane | 2.7 |
| 1,3-dimethoxypropane | 9.6 |
| 1,2-dimethoxyethane | 9.4 |

(*) Mols $\times 10^2$ of ether complexed per 100 g $MgCl_2$.

TABLE 2

| Ex. | Ether | Yield g PP/g cat. comp. | I.I. % | Intrinsic viscosity dl/g |
|---|---|---|---|---|
| 1 | 2,2-diethyl-1,3-dimethoxypropane | 1600 | 85.1 | |
| 2 | 2-methyl-2-isopropyl 1,3-dimethoxypropane | 2300 | 96.7 | 1.95 |
| 3 | 2,2-diisobutyl-1,3-dimethoxypropane | 8500 | 97.4 | 1.53 |
| 4 | 2,2-diisobutyl-1,3-diethoxypropane | 3100 | 92.8 | |
| 5 | 2,2-diisobutyl-1,3-di-n-butoxypropane | 2400 | 87.7 | 1.45 |
| 6 | 2,2-diphenyl-1,3-dimethoxypropane | 5700 | 98.7 | |
| 7 | 2,2-bis (methylcyclohexyl) 1,3-dimethoxypropane | 5000 | 92.7 | 1.30 |
| 8 | 1,3-diisobutoxypropane | 2900 | 73.2 | |
| 9 | 2,2-pentamethylene 1,3-dimethoxypropane | 2500 | 92.0 | |
| 10 | 1,1-bis (methoxymethyl) bicyclo-(2,2,1)-heptane | 2900 | 89.1 | |
| 11 | 2-isopentyl-2-isopropyl-1,3-dimethoxypropane | 3950 | 98.5 | |
| 12 | 1-isopropyl-2,2-dimethyl-1,3-dimethoxypropane | 2500 | 88.8 | 1.33 |
| 13 | 2,2,3,3-tetraethyl 1,3-dimethoxybutane | 4200 | 90.6 | |
| 14 | 1,2-bis (methoxymethyl) bicyclo-(2,2,1)-heptane | 3800 | 97.4 | |
| 15 | 1,1,2,2-tetramethyl 1,2-dimethoxyethane | 2100 | 90.6 | |
| 16 | o-methylmethoxyanisole | 2000 | 87.0 | 1.75 |
| 17 | 2,2 dibenzyl 1,3-dimethoxypropane | 5100 | 68.1 | 1.20 |
| Comp. Ex. 1 | 1,3-dimethoxypropane | 210 | 62.8 | 1.33 |
| Comp. Ex. 2 | 1,2-dimthoxyethane | 700 | 70.2 | |

Other features, advantages and embodiments of the invention disclosed herein will be readilY apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A catalyst for the polymerization of olefins comprising the reaction product of:
    (a) an Al-alkyl compound;
    (b) an ether with at least 2 ether groups capable of complexing anhydrous magnesium dichloride under standard reaction conditions when present in an amount of less than 60 mmols per 100 g magnesium dichloride; and (c) a solid catalyst component comprising anhydrous magnesium dihalide in active form and having supported thereon a titanium compound containing at least one Ti-halogen bond and a electron-donor compound which is more than 70 mole % extractable from the solid with Al-triethyl, wherein the solid after extraction has a surface area of more than 20 m²/g.

2. The catalyst of claim 1 suitable for the polymerization of olefins having the formula CH$_2$=CHR in which R is an alkyl radical with 1-6 carbon atoms or an aryl radical and wherein the Al-alkyl compound is an Al-trialkyl compound or an Al-alkyl compound with one or more Al atoms linked to each other through oxygen or nitrogen atoms or SO$_4$ or SO$_3$ groups.

3. The catalyst of claim 1 wherein the magnesium halide is magnesium dichloride, the titanium compound is a titanium halide and the electron-donor is a phthalic acid ester.

4. The catalyst of claim 3 in which the phthalic acid ester is selected from diisobutyl and di-n-octylphthalates.

5. The catalyst of claim 2 in which the ether has the formula:

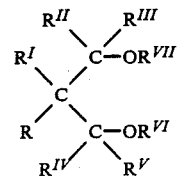

in which R, $R^I$, $R^{II}$, $R^{III}$, $R^{IV}$ and $R^V$ are the same or different and are H, linear or branched alkyl radicals, or cycloalkyl, aryl, alkylaryl or arylalkyl radicals with 1-18 carbon atoms, provided R and $R^I$ are not both hydrogen; $R^{VI}$ and $R^{VII}$ have the same meaning as R and $R^I$ except for hydrogen; provided that when $R^I$ to $R^V$ are hydrogen and $R^{VI}$ and $R^{VII}$ are methyl, R is not methyl; and two or more R to $R^{VII}$ can be linked to form a cyclic structure.

6. The catalyst of claim 5 in which $R^{VI}$ and $R^{VII}$ are methyl and R and $R^I$ are the same or different, and are selected from the group consisting of isopropyl, isobutyl, t-butyl, cyclohexyl, isopentyl and radicals.

7. The catalyst of claim 2 in which the ether is 2,2-diisobutyl-1,3-dimethoxypropane.

8. The catalyst of claim 2 in which the ether is 2-isopropyl-2-isopentyl-1,3-dimethoxypropane.

9. The catalyst of claim 2 in which the ether is 2,2-bis(methylcyclohexyl)-1,3-dimethoxypropane.

10. The catalyst of claim 1 wherein the molar ratio of said Al-alkyl compound to said ether is from 5:1 to 100:1.

11. The catalyst of claim 5 wherein the ether complexes anhydrous magnesium dichloride in the amount of 5 to 35 mmoles ether per 100 g dichloride.

* * * * *

UNITED STATES PATENT AND TRADEMARK OFFICE
CERTIFICATE OF CORRECTION

PATENT NO. : 4,978,648
DATED : December 18, 1990
INVENTOR(S) : Pier C. Barbe' et al.

It is certified that error appears in the above-identified patent and that said Letters Patent is hereby corrected as shown below:

In the Abstract, second line thereof, change "alpha-olefin" to --alpha-olefins--.

In the Abstract, third to the last line thereof, change "component wherein the solid," to --wherein the solid component,--.

At col. 1, line 15, change "4,278,718" to --4,298,718--.

At col. 2, line 12, change "$R^I$ and R'" to --R and $R^I$--.

At col. 2, lines 67-68, change "2,3-diisopropyl-1,4-diethoxybutane" to --2,3-diisopropyl-1,4-dimethoxybutane--.

At col. 4, line 67, after "reacted in" insert --a--.

At col. 6, line 19, change "$(CH_2H_5)_2$" to --$(C_2H_5)_2$--.

At col. 8, line 23, change "2,2-diethyl-" to --2,2-dimethyl- --.

At col. 10, line 22, after "and" insert --cyclohexylethyl--.

Signed and Sealed this

Twelfth Day of May, 1992

Attest:

DOUGLAS B. COMER

*Attesting Officer*    Acting Commissioner of Patents and Trademarks